United States Patent
Luo

(10) Patent No.: US 7,248,896 B2
(45) Date of Patent: Jul. 24, 2007

(54) DESKTOP CELLULAR PHONE HAVING SIM CARD-RELATED SECURITY FEATURES

(75) Inventor: Kunyuan Luo, Shanghai (CN)

(73) Assignee: Spreadtrum Communications Corporation, Sunnyvale, CA (US)

( * ) Notice: Subject to any disclaimer, the term of this patent is extended or adjusted under 35 U.S.C. 154(b) by 432 days.

(21) Appl. No.: 10/986,734

(22) Filed: Nov. 12, 2004

(65) Prior Publication Data

US 2006/0105809 A1    May 18, 2006

(51) Int. Cl.
*H04B 1/38* (2006.01)
(52) U.S. Cl. .................. 455/558; 455/411; 713/169
(58) Field of Classification Search .............. 455/410, 455/411, 435.1, 550.1, 557, 558, 435.2; 713/168, 713/169
See application file for complete search history.

(56) References Cited

U.S. PATENT DOCUMENTS 6,263,214 B1 * 7/2001 Yazaki et al. .............. 455/558
6,898,708 B2 * 5/2005 Hori et al. .................. 713/171
6,934,531 B1 * 8/2005 Hake et al. ................. 455/410
2001/0030235 A1 * 10/2001 Hedemann et al. ......... 235/451
2004/0111614 A1 * 6/2004 Yamada ..................... 713/168
2005/0075092 A1 * 4/2005 Kim ........................... 455/411
2005/0181829 A1 * 8/2005 Cho et al. ................... 455/558

* cited by examiner

*Primary Examiner*—Edward F. Urban
*Assistant Examiner*—Nhan T. Le
(74) *Attorney, Agent, or Firm*—Perkins Coie LLP

(57) ABSTRACT

A system and method for securing a desktop cellular phone, having a SIM card inserted therein, includes turning on the phone and sending first data from a SIM card processor to the phone processor. The phone processor computes second data, using a first algorithm and the first data, and sends the second data to the SIM card processor. Meanwhile, the SIM card processor computes third data using a second algorithm and the first data. The SIM card processor compares the second data to the third data, and determines whether a relationship between the second data and the third data satisfies a first predefined requirement. If it does not, operation of the phone is, at least in part, prevented. Similar steps may additionally, or alternatively, be performed by the phone processor to verify that an authorized SIM card is inserted in the phone.

21 Claims, 2 Drawing Sheets

DESKTOP CELLULAR PHONE HAVING SIM CARD-RELATED SECURITY FEATURES

BACKGROUND

Desktop cellular phones, such as GSM ("Global System for Mobile Communication") desktop cellular phones, as well as other cellular phones, due to their mobile nature, are susceptible to several security issues that do not affect traditional desktop phones. For example, a GSM desktop cellular phone may be removed from its intended location and used to place and receive calls, and incur charges, from an unauthorized location. Additionally, a GSM cellular phone typically requires a SIM ("Subscriber Identity Module") card to place and receive calls, and to perform other operations. Because the SIM cards inserted into GSM desktop phones are generally removable, and typically reusable in other GSM cellular phones, the potential exists for improper use of SIM cards, as well as improper use of phones with unauthorized SIM cards.

An employee of a company, for example, may remove a SIM card, provided by the employer, from the employee's work-issued desktop cellular phone, and use the SIM card in another cellular phone, without authorization from the employer. In such a case, charges incurred using the SIM card would likely be billed to the employer. Similarly, an employee could use an outside SIM card in the employee's work-issued desktop cellular phone to place unauthorized personal calls during work hours, which could lead to lower employee productivity. Thus, a need exists for improved security features in desktop cellular phones.

SUMMARY OF THE INVENTION

The invention is directed to desktop cellular phones having security features, as well as methods for implementing these features.

In one aspect, a method for securing a cellular phone having a SIM card inserted therein includes the steps of turning on the phone and sending first data from a SIM card processor to the phone processor. The phone processor computes second data, using a first algorithm and the first data, and sends the second data to the SIM card processor. Meanwhile, the SIM card processor computes third data using a second algorithm and the first data. The SIM card processor compares the second data to the third data and determines whether a relationship between the second data and the third data satisfies a first predefined requirement. If the relationship between the second data and third data does not satisfy the first predefined requirement, operation of the phone is, at least in part, prevented.

In another aspect, the method for securing a cellular phone further includes the steps of sending fourth data from the phone processor to the SIM card processor, and computing fifth data, via the SIM card processor, using a third algorithm and the fourth data. The SIM card processor sends the fifth data to the phone processor, which computes sixth data using a fourth algorithm and the fourth data. The phone processor compares the fifth data to the sixth data, and determines whether a relationship between the fifth data and the sixth data satisfies a second predefined requirement. If the relationship between the fifth data and the sixth data does not satisfy the second predefined requirement, operation of the phone is, at least in part, prevented.

In another aspect, the first predefined requirement is that the second data and the third data are equal to one another.

In another aspect, operation of the phone is completely prevented if the relationship between the second data and the third data does not satisfy the first predefined requirement.

In another aspect, operation of the phone is partially prevented if the relationship between the second data and the third data does not satisfy the first predefined requirement.

In another aspect, a method for securing a cellular phone having a SIM card inserted therein includes the steps of turning on the phone and sending first data from the phone processor to the SIM card processor. The SIM card processor computes second data, using a first algorithm and the first data, and sends the second data to the phone processor. Meanwhile, the phone processor computes third data using a second algorithm and the first data. The phone processor compares the second data to the third data and determines whether a relationship between the second data and the third data satisfies a first predefined requirement. If the relationship between the second data and third data does not satisfy the first predefined requirement, operation of the phone is, at least in part, prevented.

In another aspect, the predefined requirement is stored in a nonvolatile memory of the phone.

In another aspect, a cellular phone having a SIM card inserted therein includes means for sending first data from the phone to the SIM card, and means for generating second data, using at least the first data. The phone further includes means for sending the second data from the SIM card to the phone, means for generating third data, using at least the first data, and means for comparing the second data to the third data. The phone also includes means for determining whether a relationship between the second data and the third data satisfies a first predefined requirement, and means for preventing, at least in part, operation of the phone, if the relationship between the second data and the third data does not satisfy the first predefined requirement.

In another aspect, the phone further includes means for sending fourth data from the SIM card to the phone, and means for generating fifth data, using at least the fourth data. The phone further includes means for sending the fifth data from the phone to the SIM card, means for generating sixth data, using at least the fourth data, and means for comparing the fifth data to the sixth data. The phone also includes means for determining whether a relationship between the fifth data and the sixth data satisfies a second predefined requirement, and means for preventing, at least in part, operation of the phone, if the relationship between the fifth data and the sixth data does not satisfy the second predefined requirement.

In another aspect, a cellular phone having a SIM card inserted therein includes means for sending first data from the SIM card to the phone, and means for generating second data, using at least the first data. The phone further includes means for sending the second data from the phone to the SIM card, means for generating third data, using at least the first data, and means for comparing the second data to the third data. The phone also includes means for determining whether a relationship between the first data and the second data satisfies a predefined requirement, and means for preventing, at least in part, operation of the phone, if the relationship between the first data and the second data does not satisfy the predefined requirement.

In another aspect, a method for securing a specified cellular phone having a processor, and a SIM card inserted therein, includes the steps of turning on the cellular phone, and verifying, via the SIM card processor, that the cellular phone is the specified cellular phone. The method further includes the steps of verifying, via the phone processor, that the SIM card inserted therein is an approved SIM card, and preventing, at least in part, operation of the phone, if the cellular phone is not the specified cellular phone, or if the SIM card is not the approved SIM card.

Other features and advantages of the invention will appear hereinafter. The features of the invention described above can be used separately or together, or in various combinations of one or more of them. The invention resides as well in sub-combinations of the features described.

DETAILED DESCRIPTION OF THE DRAWINGS

Figure 1:
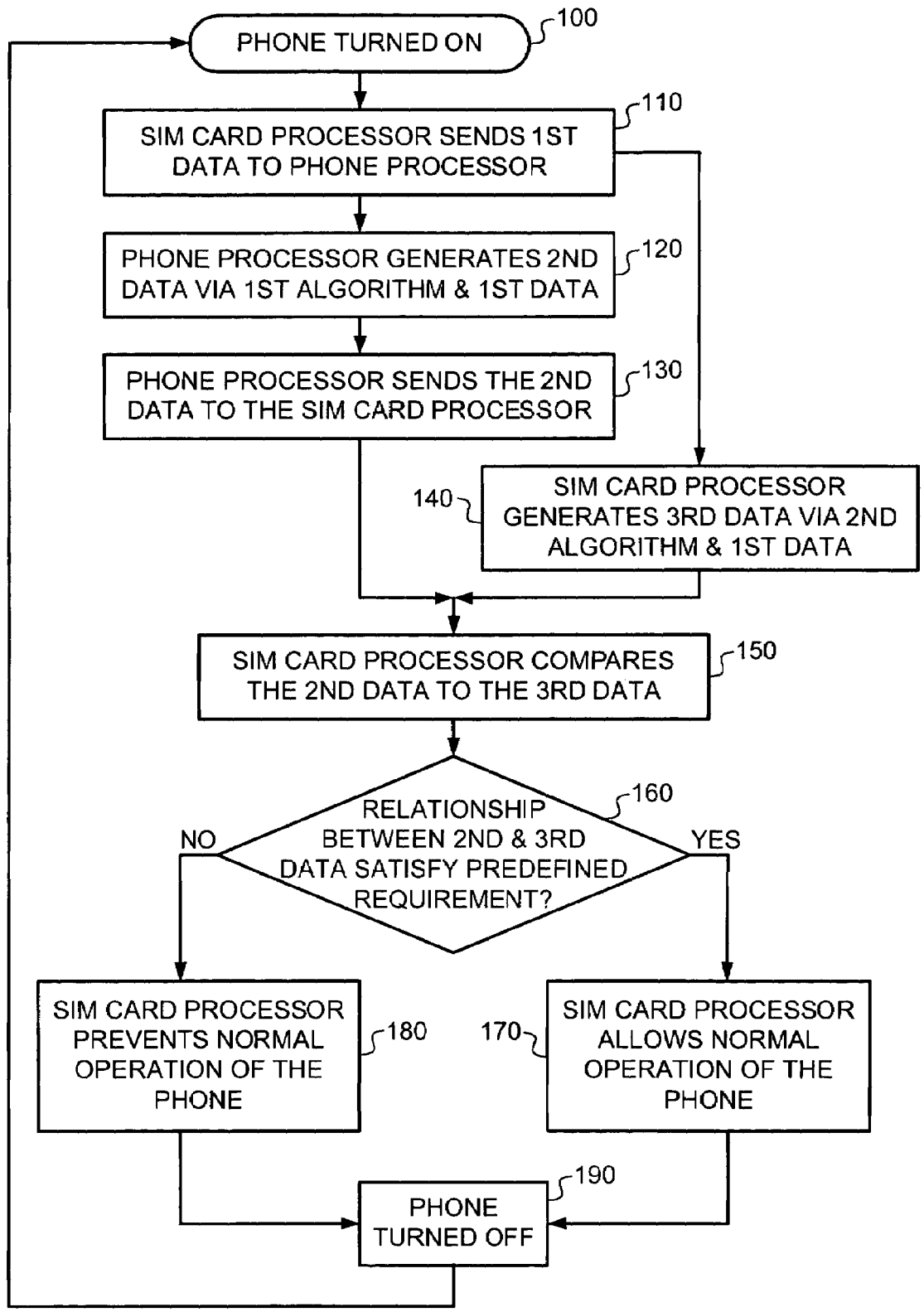
FIG. 1 is a flow diagram illustrating a method of securing a desktop cellular phone according to one preferred embodiment.

The security methods described herein may be implemented in any cellular telephone, such as a desktop cellular phone, or in any other telephone that includes a processor, a SIM card, and nonvolatile memory storage, such as flash memory. Flash memory is a type of electrically erasable programmable read-only memory (EEPROM), in which a section of memory cells can typically be erased in a single action, or in a "flash." Flash memory can be written in blocks, rather than bytes, which makes it relatively easy to update.

A key feature of flash memory is that it retains its data when the device in which it is contained is powered off. Additionally, a flash memory chip, for example, can be electrically erased and reprogrammed without being removed from the circuit board on which it resides. In the desktop cellular phones described herein, nonvolatile memory is preferably embodied in a flash memory card or chip that is insertable into a phone. The nonvolatile memory may alternatively be provided in the phone in or on any other suitable medium.

A SIM card typically includes embedded circuitry for storing information about the services available to a user (e.g., caller ID, fax, data, call divert, voicemail, etc.). The SIM card also identifies the user to an operator network, and contains a microprocessor chip, or other processor, which stores unique information about the user's account, including the user's phone number. Thus, the user's phone number, as well as any other services associated with the SIM card, is changed any time that the user replaces an existing SIM card with a new SIM card. SIM cards are typically provided by a GSM cellular phone operator, and are generally available on a subscription basis, where the user is billed at regular intervals. Alternatively, SIM cards may be available on a prepaid basis, in which case the user may purchase additional airtime to continue use of a given SIM card.

Desktop cellular phones typically include at least one USB (Universal Serial Bus) connector or port for connecting the desktop cellular phone to a computer or other device. A desktop cellular phone may additionally, or alternatively, be connectable to a computer via an infrared device, or another suitable device. The security features and algorithms described herein are preferably writable into the phone's nonvolatile, or flash, memory, via a computer connected to the desktop phone, or via another suitable means or method. For example, the security features may be programmed via AT (Attention) commands entered via a computer by a user, via "hidden commands" in a software program, via an SMS (Short Messaging Service), via keys on the phone itself, via a voice recognition program, etc. Security features and algorithms are also preferably programmable into one or more memory units in the SIM card inserted in the phone, for phone verification, purposes, as described below.

In the methods described herein, a SIM card is pre-programmed to operate with only one specified desktop cellular phone, or with a limited number of specified cellular phones, and/or a desktop cellular phone is pre-programmed to operate with only one specified SIM card, or with a limited number of specified SIM cards. In one preferred embodiment, a SIM card is pre-programmed to operate with only one desktop cellular phone, and that desktop cellular phone is pre-programmed to work with only that SIM card. Thus, the phone is inoperable, at least in part, unless the specified SIM card is inserted therein, and the SIM card is inoperable when inserted in any phone except for the specified phone, as described in detail below.

FIG. 1 is a flow diagram illustrating one preferred method of securing a desktop cellular phone, wherein the SIM card in the phone verifies that the phone is authorized for use with that SIM card. At step 100, the phone is turned on. At step 110, the SIM card processor sends first data, which may be a string or block of numbers and/or letters, a single number or letter, or data in any other suitable form, to the phone processor. The first data may be randomly generated, or may be a predetermined number, letter, etc.

At step 120, the phone processor enters the first data into a first algorithm, stored in the phone's nonvolatile memory, or other memory, for computing or generating second data, which may be a string or block of numbers and/or letters, a single number or letter, or data in any other suitable form. The first algorithm may be any suitable formula, or other finite set of instructions, for generating the second data. The use of such algorithms in computer programming and other technical applications is well known in the art. At step 130, the phone processor sends the second data to the SIM card processor.

Meanwhile, at step 140, the SIM card processor enters the first data into a second algorithm for computing or generating third data, which may be a string or block of numbers and/or letters, a single number or letter, or data in any other suitable form. The second algorithm may be any suitable formula, or other finite set of instructions, for generating the third data. At step 150, the SIM card processor compares the second data to the third data. At step 160, the SIM card processor determines whether the relationship between the second data and the third data satisfies a predefined requirement. The predefined requirement may be, for example, that the second and third data are equal to one another, or that the second and third data have any other suitable relationship. The predefined requirement is preferably stored in a memory unit in the SIM card, or in any other suitable location.

If the relationship between the second and third data satisfies the predefined requirement, the SIM card processor allows normal operation of the desktop cellular phone, as shown at step 170. If, conversely, the relationship between the second and third data does not satisfy the predefined requirement, the SIM card processor prevents normal operation of the desktop cellular phone, as shown at step 180. In such a case, operation of the phone may be completely prevented, or use of only certain features of the phone may be prevented, as determined by a programmer, designer, manufacturer, developer, employer, or other specified entity. At step 190, the phone is turned off. In a preferred embodiment, the verification steps described above are performed each time that the phone is turned on.

In the embodiment outlined in FIG. 1, the SIM card is restricted to being used in only one, or in a finite number, of specified cellular phones. Accordingly, if the SIM card is stolen or otherwise removed form the phone, for example, it cannot be used to operate an unauthorized phone, and the provider of the SIM card will therefore not incur charges for calls that could otherwise have been placed using an unauthorized phone. Additionally, any incentive to steal the SIM card is greatly reduced.

Figure 2:
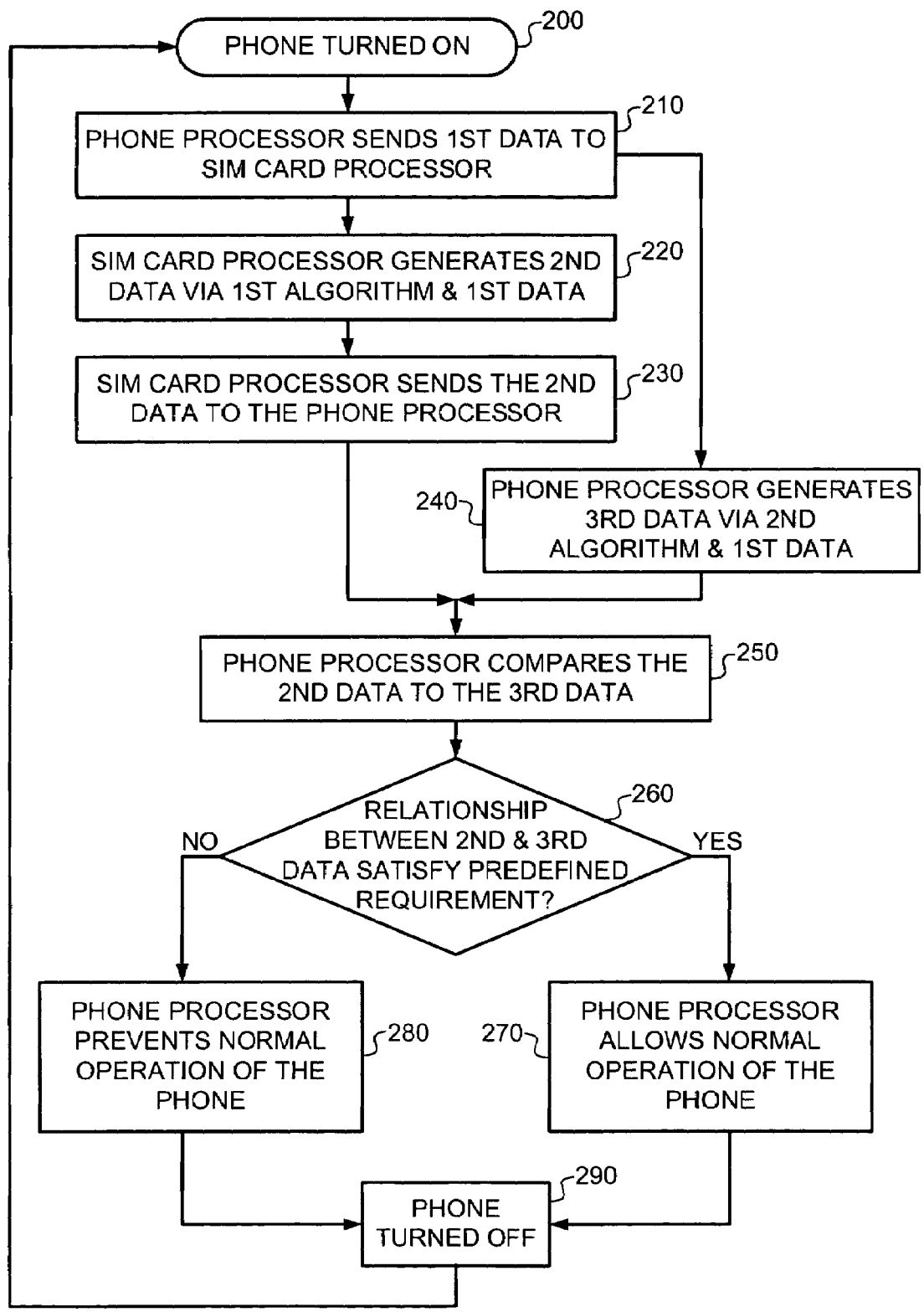
FIG. 2 is a flow diagram illustrating a method of securing a desktop cellular phone according to another preferred embodiment.

FIG. 2 is a flow diagram illustrating another preferred method of securing a desktop cellular phone, wherein the phone verifies that the SIM card inserted in the phone is authorized for use in that phone. At step 200, the phone is turned on. At step 210, the phone processor sends first data, which may be a string or block of numbers and/or letters, a single number or letter, or data in any other suitable form, to the SIM card processor. The first data may be randomly generated, or may be a predetermined number, letter, etc.

The terms "first data," "second data," "first algorithm," "second algorithm," etc., as used herein, are all relative terms, and may be the same or different than the same or similar terms used in other embodiments described herein. For example, the "first data" described in the embodiment outlined in FIG. 1 may be different than the "first data" described in the embodiment outlined in FIG. 2. Thus, the terms are used for ease of description only, and are not intended to be limiting with respect to different embodiments.

At step 220, the SIM card processor enters the first data into a first algorithm for computing or generating second data, which may be a string or block of numbers and/or letters, a single number or letter, or data in any other suitable form. The first algorithm may be any suitable formula, or other finite set of instructions, for generating the second data. At step 230, the SIM card processor sends the second data back to the phone processor.

Meanwhile, at step 240, the phone processor enters the first data into a second algorithm for computing or generating third data, which may be a string or block of numbers and/or letters, a single number or letter, or data in any other suitable form. The second algorithm may be any suitable formula, or other finite set of instructions, for generating the third data. At step 250, the phone processor compares the second data to the third data. At step 260, the phone processor determines whether the relationship between the second data and the third data satisfies a predefined requirement. The predefined requirement may be, for example, that the second and third data are equal to one another, or that the second and third data have any other suitable relationship. The predefined requirement is preferably stored in the nonvolatile, or flash, memory of the phone, or in another suitable location.

If the relationship between the second and third data satisfies the predefined requirement, the phone processor allows normal operation of the desktop cellular phone, as shown at step 270. If, conversely, the relationship between the second and third data does not satisfy the predefined requirement, the phone processor prevents normal operation of the desktop cellular phone, as shown at step 280.

In such a case, operation of the phone may be completely prevented, or the use of only certain features of the phone may be prevented, as determined by a programmer, designer manufacturer, developer, employer, or other specified entity. For example, the phone processor may prevent all calling functions, and/or other charge-incurring functions, but allow one or more non-charge-incurring functions, such as displaying a time and date on a display screen of the phone. At step 290, the phone is turned off. In a preferred embodiment, the verification steps described above are performed each time that the phone is turned on.

In the embodiment outlined in FIG. 2, the desktop cellular phone is restricted to being used with only one, or with a finite number, of specified SIM cards. Accordingly, if the phone is stolen, for example, and an unauthorized SIM card is inserted into the phone, the phone will not be able to place or receive calls, or perform any of the other functions provided by the SIM card. Thus, any incentive to steal the phone is greatly reduced. Additionally, if an employee, for example, attempts to use the phone, by inserting an unauthorized SIM card into the phone, the phone will not, at least in part, operate.

In one preferred embodiment, the verification steps outlined in FIGS. 1 and 2 are performed in conjunction with one another, such that the SIM card in the phone verifies that the phone is authorized for use with that SIM card, and the phone verifies that the SIM card inserted therein is authorized for use in that phone. Accordingly, the desktop cellular phone will only be operable if an authorized SIM card is inserted therein, and the SIM card will only function if it is inserted into an authorized phone.

As explained above, the terms "first data," "first algorithm," etc., as used herein, are relative terms. Thus, when the verification steps outlined in FIGS. 1 and 2 are performed in conjunction with one another, additional terms, such as "fourth data," "third algorithm," etc. may be used, as appropriate, to differentiate between dissimilar elements.

While embodiments and applications of the present invention have been shown and described, it will be apparent to one skilled in the art that other modifications are possible without departing from the inventive concepts herein. Importantly, many of the steps detailed above may be performed in a different order than that which is described. For example, step 120 and/or step 130 could be performed previously to, simultaneously with, or subsequently to step 140. Additionally, two or more of the above-described security features may be used in conjunction with one another. The invention, therefore, is not to be restricted except by the following claims and their equivalents.

What is claimed is:

1. A method for securing a cellular phone having a processor, and a SIM card with a SIM card processor inserted in the phone, comprising the steps of:
   turning on the phone;
   sending first data from the SIM card processor to the phone processor;
   computing second data, via the phone processor, using a first algorithm and the first data;
   sending the second data from the phone processor to the SIM card processor;
   computing third data, via the SIM card processor, using a second algorithm and the first data;
   comparing, via the SIM card processor, the second data to the third data;
   determining, via the SIM card processor, whether a relationship between the second data and the third data satisfies a first predefined requirement; and
   preventing, at least in part, operation of the phone, if the relationship between the second data and the third data does not satisfy the first predefined requirement.

2. The method of claim 1 wherein the first predefined requirement is that the second data and the third data are equal to one another.

3. The method of claim 1 wherein the first data is randomly generated.

4. The method of claim 1 wherein the first data comprises a predetermined number.

5. The method of claim 1 further comprising the steps of:
sending fourth data from the phone processor to the SIM card processor;
computing fifth data, via the SIM card processor, using a third algorithm and the fourth data;
sending the fifth data from the SIM card processor to the phone processor;
computing sixth data, via the phone processor, using a fourth algorithm and the fourth data;
comparing, via the phone processor, the fifth data to the sixth data;
determining, via the phone processor, whether a relationship between the fifth data and the sixth data satisfies a second predefined requirement; and
preventing, at least in part, operation of the phone, if the relationship between the fifth data and the sixth data does not satisfy the second predefined requirement.

6. The method of claim 1 further comprising the step of allowing normal operation of the phone if the relationship between the second data and the third data satisfies the first predefined requirement.

7. The method of claim 1 wherein operation of the phone is completely prevented if the relationship between the second data and the third data does not satisfy the first predefined requirement.

8. The method of claim 1 wherein operation of the phone is partially prevented if the relationship between the second data and the third data does not satisfy the first predefined requirement.

9. The method of claim 1 wherein the sending, computing, comparing, and determining steps are performed each time that the phone is turned on.

10. A method for securing a cellular phone having a processor, and a SIM card with a SIM card processor inserted in the phone, comprising the steps of:
turning on the phone;
sending first data from the phone processor to the SIM card processor;
generating second data, via the SIM card processor, using a first algorithm and the first data;
sending the second data from the SIM card processor to the phone processor;
generating third data, via the phone processor, using a second algorithm and the first data;
comparing, via the phone processor, the second data to the third data;
determining, via the phone processor, whether a relationship between the second data and the third data satisfies a predefined requirement; and
preventing, at least in part, operation of the phone, if the relationship between the second data and the third data does not satisfy the predefined requirement.

11. The method of claim 10 wherein the predefined requirement is that the second data and the third data are equal to one another.

12. The method of claim 10 wherein operation of the phone is completely prevented if the relationship between the second data and the third data does not satisfy the predefined requirement.

13. The method of claim 10 wherein operation of the phone is partially prevented if the relationship between the second data and the third data does not satisfy the predefined requirement.

14. The method of claim 10 wherein the sending, generating, comparing, and determining steps are performed each time that the phone is turned on.

15. The method of claim 10 wherein the predefined requirement is stored in a nonvolatile memory of the phone.

16. The method of claim 15 wherein the nonvolatile memory is embodied on a flash memory chip in the phone.

17. A cellular phone having a SIM card inserted therein, comprising:
means for sending first data from the phone to the SIM card;
means for generating second data, using at least the first data;
means for sending the second data from the SIM card to the phone;
means for generating third data, using at least the first data;
means for comparing the second data to the third data;
means for determining whether a relationship between the second data and the third data satisfies a first predefined requirement; and
means for preventing, at least in part, operation of the phone, if the relationship between the second data and the third data does not satisfy the first predefined requirement.

18. The phone of claim 17 further comprising:
means for sending fourth data from the SIM card to the phone;
means for generating fifth data, using at least the fourth data;
means for sending the fifth data from the phone to the SIM card;
means for generating sixth data, using at least the fourth data;
means for comparing the fifth data to the sixth data;
means for determining whether a relationship between the fifth data and the sixth data satisfies a second predefined requirement; and
means for preventing, at least in part, operation of the phone, if the relationship between the fifth data and the sixth data does not satisfy the second predefined requirement.

19. The phone of claim 17 wherein the first predefined requirement is that the second data and the third data are equal to one another.

20. A cellular phone having a SIM card inserted therein, comprising:
means for sending first data from the SIM card to the phone;
means for generating second data, using at least the first data;
means for sending the second data from the phone to the SIM card;
means for generating third data, using at least the first data;
means for comparing the second data to the third data;
means for determining whether a relationship between the first data and the second data satisfies a predefined requirement; and
means for preventing, at least in part, operation of the phone, if the relationship between the first data and the second data does not satisfy the predefined requirement.

21. A method for securing a specified cellular phone, wherein the specified cellular phone is authorized for use only with an approved SIM card, and the approved SIM card is authorized for use only with the specified cellular phone, comprising the steps of:

turning on a phone with a SIM card inserted therein;

determining, via a SIM card processor in the inserted SIM card, whether the phone is the specified cellular phone;

determining, via a processor in the phone, whether the inserted SIM card is the approved SIM card; and preventing, at least in part, operation of the phone, if the phone is not the specified cellular phone, or if the inserted SIM card is not the approved SIM card.

* * * * *